though the objects of this invention will become apparent from the following description of the invention.

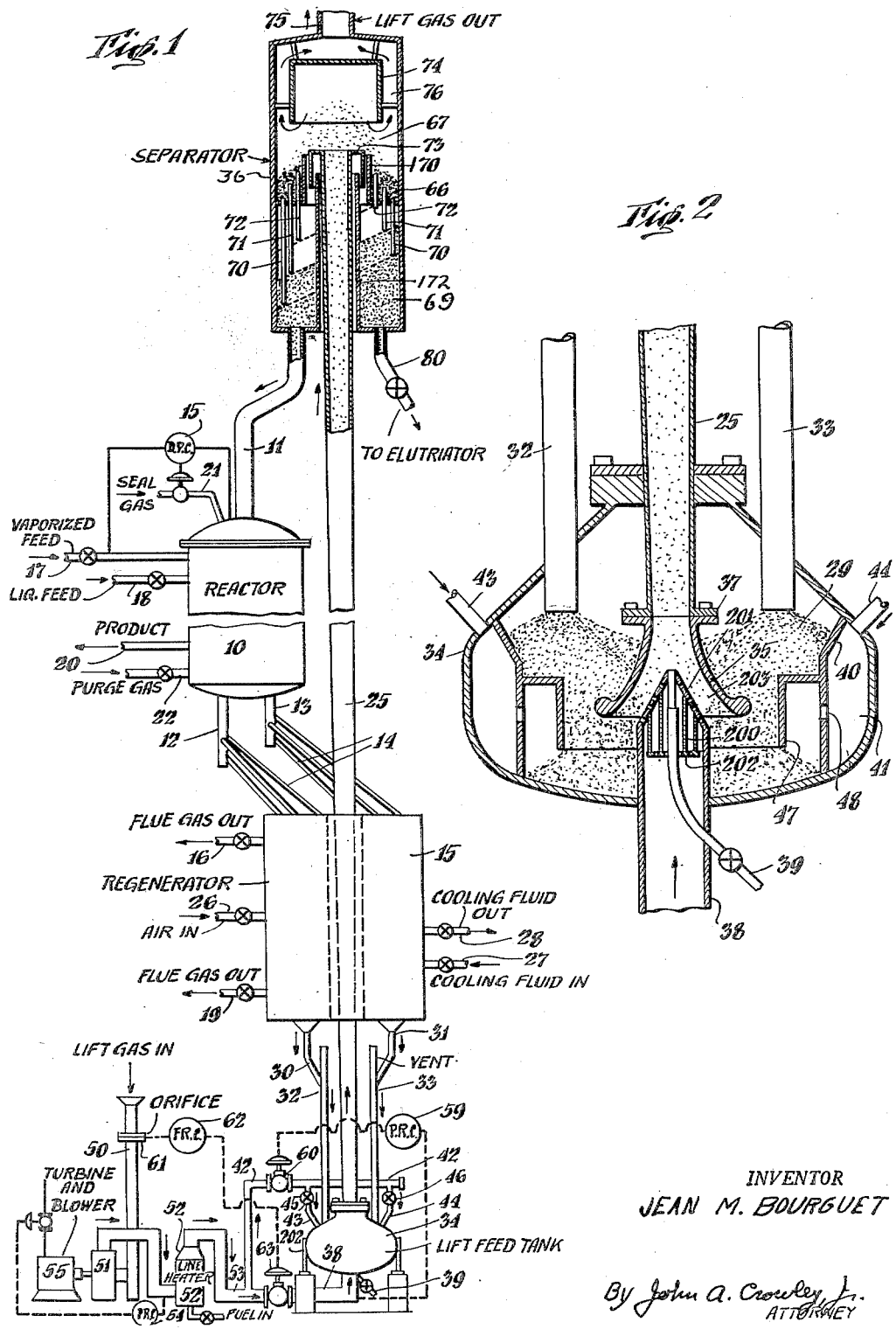

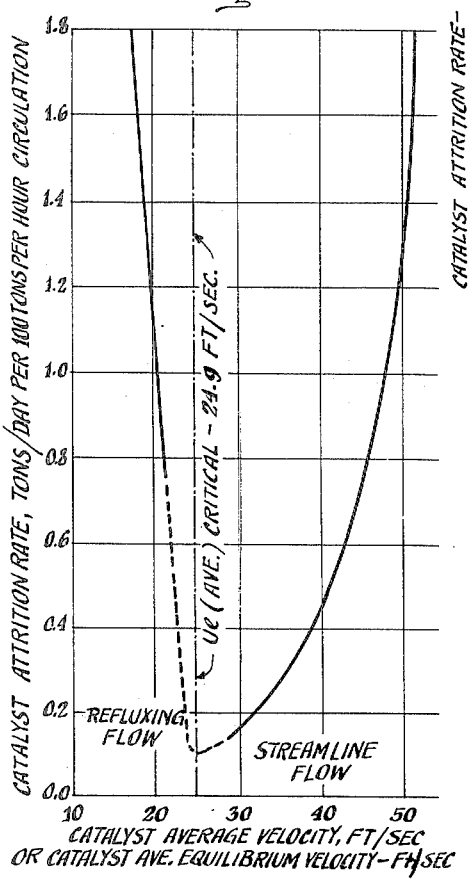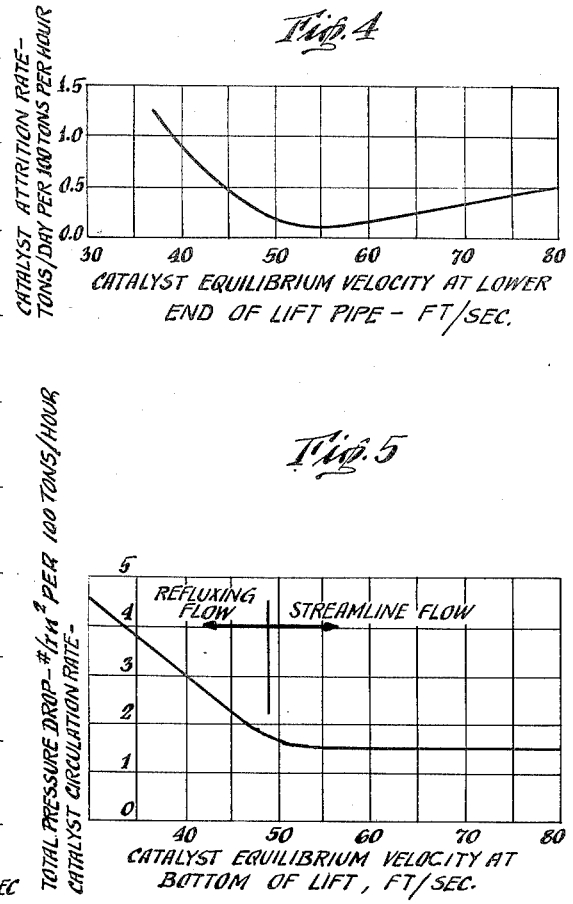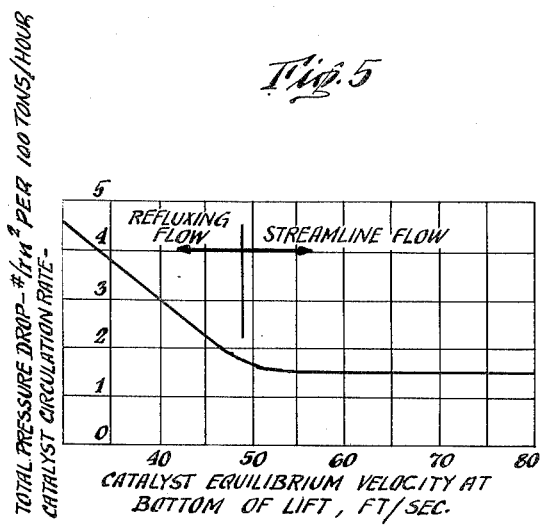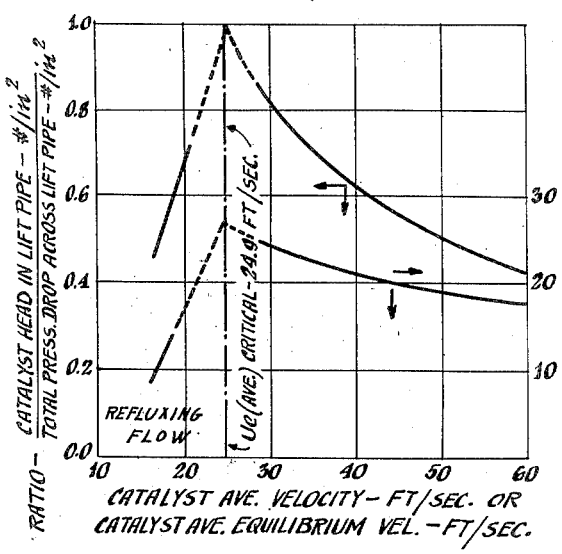

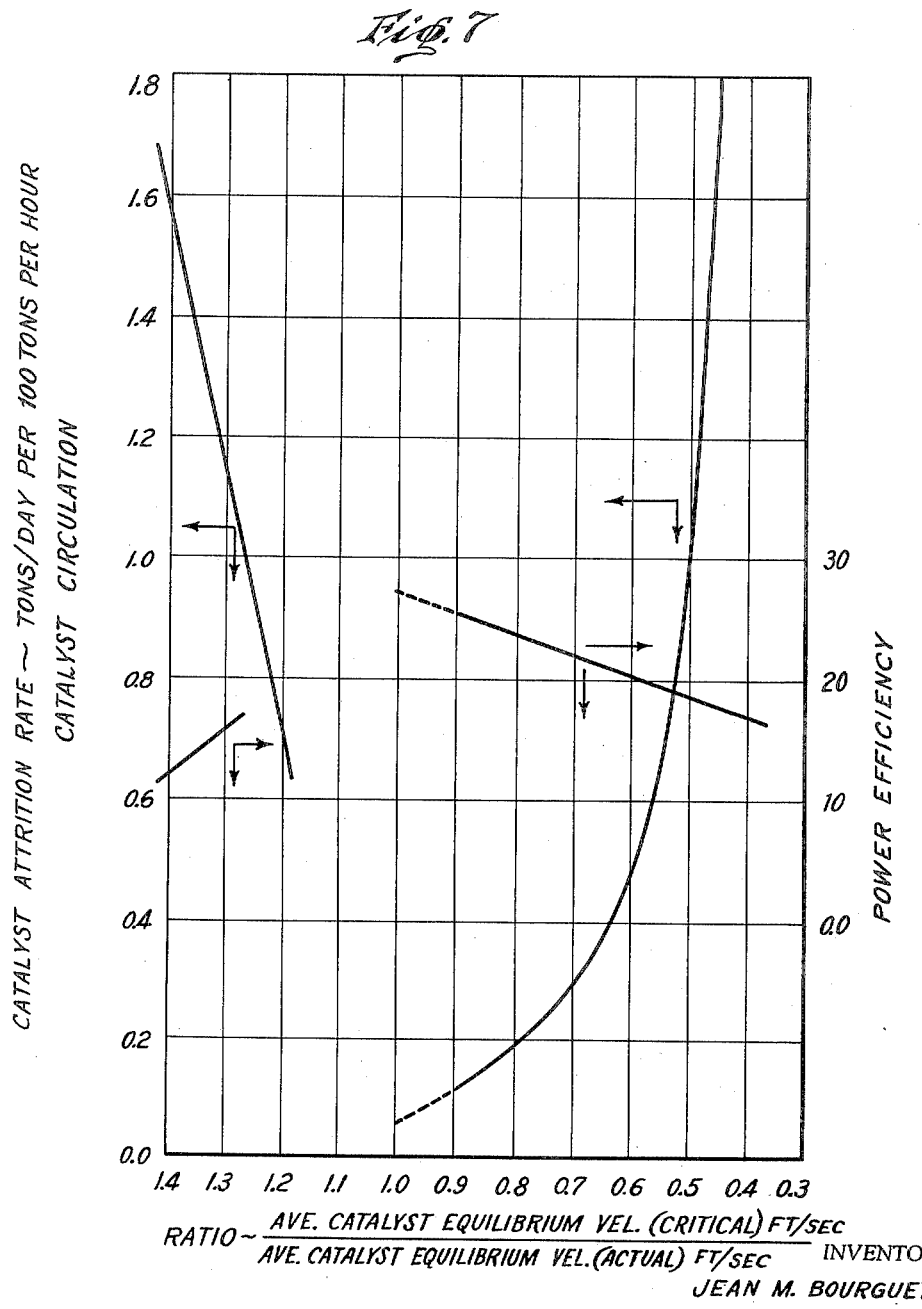

United States Patent Office
2,770,504
Patented Nov. 13, 1956

2,770,504
METHOD FOR TRANSFER OF CONTACT MATERIALS

Jean M. Bourguet, Woodbury, N. J., assignor to Socony Mobil Oil Company, Inc., a corporation of New York Application February 14, 1951, Serial No. 210,942

5 Claims. (Cl. 302—53)

This invention deals with a method for transfer of granular contact materials from a given location to a higher location. It is particularly concerned with a method for pneumatic transfer of contact material in cyclic hydrocarbon conversion systems and to an improvement in a combination method for hydrocarbon conversion in the presence of moving granular contact materials.

The invention may be applied to such processes as catalytic cracking, isomerization, hydrogenation, dehydrogenation, reforming, hydroforming, aromatization, alkylation, cyclicizing, treating and desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene. The invention in its broadest forms is not restricted to these processes and involves an important improvement in pneumatic conveying systems and methods generally and particularly where the transfer of granular solids with the least possible amount of breakage and attrition is involved such as the case in applications in which the solids are continuously circulated through a closed cyclic system.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually but not always, metallic compounds for specific purposes. When the contact material is employed principally for heat carrying purposes as in pyrolytic conversion processes it may take the form of any of a number of refractory materials such as fused alumina, mullite, Carborundum, zirconium oxide, charcoal etc., for coking processes the solid material may comprise of a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4-20 mesh by Tyler Standard Screen Analysis. The density of the material as poured into a measuring container may be within the range about 20-130 pounds per cubic foot, and in the case of adsorbents preferably within the range about 25-60 pounds per cubic foot.

An important application of this invention involves its integration into a continuous catalytic cracking system with a resultant greatly improved overall combination process. In such systems the contact material is passed cyclically through a conversion zone wherein it contacts a hydrocarbon feed at pressures usually above atmospheric and temperatures of the order of 700–1100° F. whereby the feed is converted and then through a regeneration zone wherein a carbonaceous contaminant deposited on the catalyst in the conversion zone is removed by burning. When granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, heretofore all commercial continuous catalytic cracking units of the compact moving bed have involved side by side arrangement of reactor and kiln thereby requiring two elevators and have invloved relatively low catalyst circulation rates. It has been found desirable to increase catalyst circulation rates in order to permit simplification of other parts of the system, particularly the kiln and to arrange the reactor and kiln in vertical series so as to require only a single catalyst transfer step per cycle. This could not be done practically with existing mechanical transfer devices. It has been proposed from time to time to effect the catalyst transfer by pneumatic catalyst transfer lifts but the use of pneumatic transfer in these cyclic conversion systems has been entirely prevented because of the very high catalyst attrition and breakage encountered in the pneumatic transfer step, and further because of excessive power requirements.

It is a major object of this invention to provide an improved method for transfer of granular contact materials. A specific object is the provision of an improved method for pneumatic transfer of granular contact materials without excessive attrition and without excessive power requirements in a continuous cyclic process for conversion of hydrocarbons.

These and other objects of this invention will become apparent from the following description of the invention.

It was originally believed that in the pneumatic transfer of granular solids through an upwardly extending lift passage, maintenance of the lowest gas velocities which would permit transfer of the solids would result in the lowest possible attrition rates. It was discovered, however, that at such low rates the attrition of the granular solids was very high. In fact, the attrition in the case of catalysts of the most durable type known was far in excess of that which could be economically tolerated in commercial continuous catalytic cracking systems. Moreover, it was discovered that for a given pneumatic lift installation the rate of catalyst attrition unexpectedly fell off very sharply as the rate of gas and catalyst flow along the lift passage increased until a critical velocity was reached at which attrition was less susceptible to velocity change. Upon further increase in velocity the attrition rate again increased but at a more gradual rate.

In a preferred form, this invention involves a method for pneumatically transferring solid particulate material suspended in a lift gas from a lift feed zone to a separation zone located at a higher level wherein the rate of solid material entry to the lift passage is regulated at the desired value, and the total rate of lift gas supply to said lift passage is adjusted to a rate at least equal to and preferably 2–20 percent above that minimum rate at which the total pressure drop across the lift passage is a minimum.

The invention may be most readily understood by reference to the attached drawings of which Figure 1 is an elevational view, partially in section, of a preferred arrangement and application of this invention, Figure 2 is a detailed sectional view of a portion of the apparatus shown in Figure 1, Figure 3 is a graph showing the relationship between catalyst average velocity and attrition rate in the operation of pneumatic lifts of the type here involved, Figure 4 is a similar graph showing relationship between catalyst equilibrium velocity at the bottom of the lift pipe and the attrition rate, Figure 5 is a similar graph showing the relationship between pressure drop and catalyst equilibrium velocity, Figures 6 and 7 are similar graphs showing the relationship between other variables in the operation of pneumatic lifts of the type here involved. The figures representing apparatus structure and arrangement are, of course, highly diagrammatic in form.

Turning now to Figure 1, there is shown a typical application of this invention in a cyclic continuous moving bed catalytic cracking process. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor through a gravity feed leg 11, which may be of the type disclosed and claimed in United States Patent Number 2,410,309, and catalyst is withdrawn from the reactor via two or more conduits 12 and 13 from which it flows through branch conduits 14 to the upper end of a catalyst regenerator 15. The withdrawal system may be similar to that now disclosed and claimed in United States Patent Number 2,546,625. Vaporized hydrocarbon feed, for example, a 500–900° F. gas oil cut may enter the upper section of the reactor via pipe 17. The feed may be preheated in a heater not shown to a temperature of the order of 700–950° F. A suitable high boiling liquid hydrocarbon feed may be supplied into the reactor via pipe 18, either cold or in preheated condition. The internal liquid feed arrangement may be similar to that disclosed in United States Patent Number 2,574,850. The cracked lower boiling gaseous hydrocarbon products may be withdrawn from the lower section of the reactor via pipe 20. The internal arrangement associated with pipe 20 may be similar to that disclosed and claimed in United States Patents 2,458,498 and 2,459,096. A suitable inert seal gas such as steam or flue gas may be supplied to an upper seal zone in the reactor via pipe 21. The rate of seal gas supply is maintained by differential pressure controller 15 sufficient to control the pressure in the seal zone slightly above that in the reaction zone proper. Similarly, a seal and purge gas is admitted into the lower section of the reactor via pipe 22 to purge gaseous hydrocarbons from the effluent catalyst. It should be understood that the word "gaseous" as employed herein in describing and claiming this invention is intended in a broad sense as covering materials in the gaseous phase under the particular operating conditions involved regardless of what may be the phase of such materials under ordinary atmospheric conditions. The reactor may be operated at a pressure near or somewhat above or below that in the kiln. When the reactor pressure is substantially above that in the kiln it may be desirable to provide a depressuring zone in the legs 12 and 13.

While the invention is not limited thereto the kiln shown is of annular shape so as to provide a central shaft through which a lift conduit 25 extends. The kiln is provided with a central air inlet 26 and flue gas outlets 16 and 19 adjacent either end. A bank of cooling tubes is provided in the lower section of the kiln supplied with a suitable cooling liquid or gas via pipe 27. Cooling fluid leaves these tubes via pipe 28. Suitable internal arrangements for the kiln here shown are disclosed and claimed in United States Patent Number 2,695,220 and Serial Number 186,954, filed in the United States Patent Office September 27, 1950.

The catalyst passes from kiln 15 via two or more pipes 30 and 31 as compact streams delivering onto compact gravity feed legs in pipes 32 and 33 respectively. These legs are vented to the atmosphere on their upper ends, and suitable flow measuring devices may be provided in association therewith.

The catalyst delivers from legs 32 and 33 onto a bed 29 thereof in a lift feed tank 34. A substantially vertical tapered lift pipe 25 extends upwardly from a location under the surface of the bed 29 and intermediate the ends of tank 34 to a location within and intermediate the ends of a combination settling-surge vessel 36 which is positioned a substantial distance above the reactor 10. A flared mouth piece 35 is connected by flange 37 to the lower end of the lift pipe 25. This mouth piece is preferably flared outwardly along a curve, approximately a hyperbolic spiral. A detailed view, in section, of this mouth piece is shown in Figure 2. The design of the flared mouth piece is disclosed and claimed in detail in application Serial Number 211,343 filed in the United States Patent Office February 16, 1951. It is emphasized at this point that by the expressions lower end of lift passage and lower end of lift stream as employed herein in describing this invention, the lower end of the lift pipe 25 above the flared mouth piece 35, i. e., at the level of flange 37 is intended and these expressions are not to be construed as meaning the lower end of the mouth piece.

A conduit 38 having, if desired, a perforated conical roof 201 located directly below and preferably at least partly within the flared mouth piece 35 is provided for introduction of primary lift gas substantially directly into the lift passage without the necessity of its flow through any substantial portion of the bed 29. A number of vertical cylindrical vanes 200 are arranged within and concentrically with respect to the upper discharge portion of conduit 38 so as to divide the discharge portion of conduit 38 and the roof piece 201 into a plurality of concentric passages. Rings 202 attached to the lower end of the vanes form restricted slot openings to these passages from below. This arrangement insures uniform distribution of the primary air to all portions of the lift passage cross-section. In arrangements of the type described the width of the annular passage 203 between the mouth piece 35 and gas inlet distributor cone 201 will vary depending upon the dimensions of the lift pipe. As an example, for a 20″ diameter lift pipe, 200 feet high, the width of the annular passage 203 was about 2 inches. Conduit 39 is a catalyst drain employed only when the unit is shut down. A ring partition 40 is arranged within the feed tank to provide an annular secondary gas plenum chamber 41. Secondary gas is supplied this plenum chamber from manifold 42 via pipes 43 and 44, bearing control valves 45 and 46 respectively. A downwardly facing ring type angle baffle 47 is provided to form a means for distributing secondary gas into the bed 29. Orifices 48 communicate the plenum chamber 41 with the space under baffle 47. The secondary gas in order to reach the lift passage must pass through a portion of the feed tank in which, at least in the absence of gas flow, there exists a substantial thickness of compact catalyst mass or bed between the distributors 47 and the lower end of mouth piece 35.

It has been found that the rate of catalyst entry into the lift can be regulated by control of the rate of secondary gas flow and, that once this is set, the total gas velocity, catalyst velocity and stream density in the lift can be regulated by control of the primary air supply. This method of operation is broadly disclosed and claimed in United States Patent Number 2,666,731. The improved method of transferring catalyst from the kiln to the lift feed tank in combination with the pressure type lift is disclosed and claimed in United States Patent Number 2,697,685. The lift gas which may be air, steam or flue gas, for example, is drawn through conduit 50 into the blower by which it is forced through line burner 52 wherein it is heated and then via conduit 53 to supply manifolds 42 and 38. The pressure at the blower 51 is maintained constant by pressure regulating controller 54 which controls the speed of the turbine 55. Other things being equal the pressure at the inlet to the mouth piece 35 will increase with increasing catalyst throughput rates. Hence by setting the pressure regulating controller 59 at a given pressure the rate of secondary air flow can be maintained substantially constant through actuation of control valve 60 by controller 59. The total rate of gas supply is maintained constant at any desired set valve by means of orifice 61, flow regulating controller 62 and control valve 63. Once the controller 62 is set, an increase in secondary air flow is accompanied by an automatic equal decrease in primary air flow. If desired for less preferable operations the preheating of the lift gas may be omitted.

The lift pipe 25 shown is of tapered construction substantially along its entire length, having its greatest cross-section at its upper end. A partition 66 is arranged across the vessel 36 shortly below the upper end of the lift pipe to divide the vessel into an upper settling chamber 67 and a lower catalyst surge chamber 69. Three concentric rings of pipes 70, 71 and 72 extend through the partition 66 for transfer of catalyst from the settling chamber to the surge chamber. Pipes in ring 70 terminate in a plane sloping down at approximately the angle of repose of the catalyst (25-40° with the horizontal) depending upon the catalyst toward the outlet from chamber 69, which is the upper end of the gravity feed leg 11. The pipes in rings 71 and 72 terminate in their lower ends in similar planes at higher levels in the chamber 69. Flow restricting orifices (not shown) are provided within the pipes 70, 71 and 72, near the lower ends thereof. The pipes 70, 71 and 72 terminate on their upper ends in what would be the surface of a cone having its apex centrally above the upper end of the lift pipe.

In operations the major portion of the catalyst will pass downwardly as a compact stream through the ring of pipes having their lower ends nearest above the surface level of the bed in chamber 69. The throttling orifices within the pipes in any ring of pipes 70, 71 and 72 are sized to handle most of but less than all of the total catalyst circulation, most of the remainder of the flow passing through the ring of pipes terminating on their upper ends at the next higher level in chamber 67. Only a very small flow of catalyst will occur through those pipes having their lower ends below the bed surface in chamber 69. This arrangement permits transfer of the catalyst settling on the partition 66 down onto the bed in the surge chamber as throttled compact streams, thereby avoiding the impact which would be involved in free drop of the catalyst discharged from the lift onto the bed in the surge chamber. This helps to reduce attrition and breakage of the catalyst. A ring baffle 170 extends centrally up from the partition 66 to a level which substantially corresponds to the level of the upper end of the lift pipe when the unit is in normal operation and which is above the level of the upper end of the lift pipe when temperatures in the unit are low and the lift pipe has contracted. The baffle 170 prevents overflow of catalyst into the lift pipe when the unit is shut down after operation. A sleeve 172 extends up from the bottom of chamber 69 to which it is tightly fastened to a level shortly above the partition 66. A lip baffle 73 connected to the end of pipe 25 overhangs the upper end of sleeve 172 so as to prevent catalyst escape through the sleeve. An annular passage is left between the baffles 73 and 170, which in effect serves the purpose of an overflow for catalyst when the bed level on the partition 66 becomes too high. A cylindrical baffle 74 closed on its upper end is supported centrally above the lift pipe and below the top of the settling chamber. This baffle prevents direct straight line flow between the gas outlet 75 in the top of chamber 67 and the upper end of the lift passage and provides an indirect passageway 76 for flow of gas from the separation chamber along the path indicated by the flow arrows. The lower end of the baffle 74 should preferably be sufficiently close to the upper end of the lift pipe to cause a reversal in the direction of flow of most of the lift gas before it leaves the chamber 67. The stream of catalyst suspended in lift gas is rapidly expanded as it enters the settling chamber 67 which is of substantially greater horizontal cross-sectional area than the upper end of the lift conduit, whereby the stream velocity rapidly decreases and the catalyst shot up into the chamber 67, decelerates until it reaches a level where its direction of flow is reversed as it falls by gravity onto the accumulation on partition 66. A small side stream of catalyst may be withdrawn from the bottom of chamber 69 via pipe 80 to an elutriator not shown, for removal of any fines formed and the scrubbed catalyst is then returned to the cyclic system at a suitable location such as the feed tank 34.

The present invention relates particularly to the control of the operation of the lift in a manner described in detail hereinafter which permit pneumatic transfer of granular contact material without excessive attrition and breakage thereof, and to the resulting overall greatly improved cyclic conversion process. It will be understood that while the system described represents a preferred form of the invention, the construction arrangement and operation of the reactor, kiln, lift feed receptacle and separator may be modified considerably within the scope of this invention. Thus the invention is not necessarily limited to mixed vapor and liquid feeds to the reactor nor to the details of reactor and kiln design shape and relative arrangement shown. For example the reactor and kiln may be arranged side by side and two lifts employed to effect the catalyst circulation. If desired, pressure lock systems may be employed in place of the gravity feed leg described. Also the lift feed tank design may be modified and only a single lift gas supply employed. However, it should be understood, that because of the flexibility of the primary and secondary lift gas arrangement with respect to variation and control over the total rate of lift gas flow without necessarily affecting the rate of catalyst circulation, the use of that arrangement in connection with this invention is preferable and decidedly advantageous.

It is contemplated that means other than that disclosed may be employed for controlling the relative rates of primary and secondary gas flows such as, for example, the use of a three way valve at the junction of conduits 53, 38 and 42. Such an arrangement is shown in United States application Serial Number 76,017 filed February 12, 1949, now Patent 2,666,731. While the use of the flared mouth piece 35, as described, in itself helps to reduce catalyst attrition, it is contemplated that the mouth piece may be omitted or modified in shape in the broader and less preferred forms of the invention. Also it is contemplated that a simple expanded settling chamber or even a gas-solids separator of other type, for example, an impingement separator, may be substituted for the combination separator-surge vessel in broader but less preferred forms of this invention.

It has been found that if the average gas and catalyst velocities in the pneumatic lift passage fall below a certain critical minimum which depends upon certain features of the lift pipe hereinafter discussed, the catalyst attrition rate will increase very rapidly for even small increments of gas and catalyst velocity decline. This is well illustrated by the plot shown in Figure 3 in which the abscissa represents catalyst average velocity or catalyst average equilibrium velocity and the ordinate represents catalyst attrition rate in tons per day per 100 tons per hour catalyst throughput. The catalyst average equilibrium velocity may be defined as the excess of the gas average velocity under the conditions of temperature and pressure involved over the catalyst average terminal velocity. This average terminal velocity is the averaged terminal velocity of all the particles averaged for the entire length of the lift passage. In other words the total average linear gas velocity $U_g$ is equal to the catalyst average equilibrium velocity plus the catalyst average terminal velocity over the entire length of the lift passage. The data plotted in Figure 3 was taken in actual operation of a 200 ft. high tapered lift pipe having an internal diameter of 15⅜ inches at its lower end and 20⅛ inches at its upper end. As can be seen from Figure 3 in the case of this particular system there is a definite minimum and break in the velocity-attrition curve at a catalyst average equilibrium velocity of approximately 25 feet per second. The critical average minimum gas velocity for this lift pipe is 25 feet per second plus the average terminal velocity for the particles under the average conditions in the lift pipe. It has been found from a study of a number of different lift pipes that the critical average minimum gas velocity increases with increasing overall length of lift pipe, and for a given lift pipe the critical minimum gas velocity in the lift pipe is progressively greater at successively lower levels. It has been found that for a given lift pipe the critical catalyst equilibrium velocity at the lower end of the lift pipe is substantially twice the average critical catalyst equilibrium velocity.

In Figure 4 there is shown a plot of the catalyst equilibrium velocity at the lower end of the same lift pipe involved in the case of Figure 3 against the catalyst attrition rate. The data for Figure 4 was taken at catalyst throughput rates within the range about 41–54 tons per hour.

It will be noted that above the critical minimum velocity the catalyst attrition rate gradually increases but at a substantially lower rate than below the minimum velocity. While the invention is not to be construed as restricted to any particular theory set forth herein in an attempt to explain the critical and unforseeable results herein described, it is presently believed that the rapid increase in attrition below the minimum velocity may be due to the tendency for catalyst surging or refluxing in the lift pipe which refluxing is eliminated at and above the critical catalyst and gas velocities. Above these critical velocities the catalyst attrition rate gradually increases for two reasons, first because as will be pointed out hereinafter, it has been found that aside from attrition losses within the lift pipe itself a separate or additional catalyst attrition occurs in the catalyst-gas separation and catalyst collection step in the separator at the upper end of the lift pipe, which additional attrition increases with increasing catalyst actual velocity at the upper end of the lift pipe, and secondly because above a certain maximum velocity within the lift the attrition caused by catalyst particle intercollision and collision with the lift pipe wall becomes appreciable and rapidly increases with further velocity increase.

While in the particular apparatus tested the design was such that the attrition occurring in the lift passage itself and that occurring in the separator could not be separated, it is believed that where the design is such that attrition occurring in the separator is not appreciable, there should be a substantial range of gas velocities in the lift pipe above the critical minimum and below a maximum, within which range the rate of catalyst attrition is substantially constant or increases only at a very low rate with gas velocity increase. An indication of this may be found in Figure 5 which is a plot of catalyst equilibrium velocity at the lower end of the lift pipe vs. pressure drop across the entire length of the lift pipe per 100 tons per hour catalyst throughput. The same lift pipe is involved in Figures 3, 4 and 5.

It has been found that the point of minimum attrition also happens to be the point of minimum pressure drop as may be seen by comparison of the curves in Figures 4 and 5. This is also brought out by the curves shown in Figure 6 in which power efficiency and the ratio of the catalyst head in the same lift pipe to total pressure drop across the lift pipe are plotted against the catalyst average equilibrium velocity. By comparison of Figures 3 and 5 it will be noted that at the same critical velocity of approximately 25 feet per second at which the attrition rate is lowest in Figure 3, the ratio of the catalyst head in the lift to total pressure drop is a maximum. The catalyst head in the lift represents the weight in pounds of catalyst in the entire lift pipe at any instant divided by the average horizontal cross-sectional area of the lift in square inches. If the catalyst throughput rate is maintained constant while the gas rate is increased the pressure drop across the total length of the lift gradually decreases until it becomes substantially equal to the catalyst head. As stated, this is the critical point at which pressure drop across the lift is at a minimum, catalyst attrition is at a minimum and the overall power efficiency is at a maximum. The power efficiency is calculated by dividing the useful work done, i. e., the product of the pounds of catalyst lifted per unit of time and the distance lifted divided by the power supplied in the gas stream entering the lift feed tank, (i. e. the work per same unit of time involved in gas expansion across the lift pipe) assuming no recoverable power in the gas withdrawn from the separator. In the curve shown in Figure 6, for operating conditions in the lift at which there is no refluxing the ratio:

$$\left(\frac{\text{Catalyst head in lift pipe}}{\text{Total pressure drop across lift pipe}}\right)$$

has been found to be equal to the ratio:

$$\left(\frac{\text{Average critical catalyst equilibrium velocity}}{\text{Average actual catalyst equilibrium velocity}}\right)$$

In view of the above a convenient method for controlling the operation of the pneumatic lift is to set the catalyst throughput rate at the circulation rate required in the cyclic conversion system by adjusting the amount of secondary lift gas supply; and then while observing the total pressure drop across the lift pipe adjusting the primary gas stream and thus the total gas throughput until a point of minimum pressure drop for the set catalyst flow rate is reached. It is preferred to operate at gas flow rates at or not more than between about 2 to 20% and preferably between about 4 to 6% above those at which the minimum pressure drop is observed. It will be understood that in reaching the desirable total gas flow rate for a given fixed catalyst flow rate several adjustments in the secondary and total gas flow control valves may be necessary and the expression "regulating the rate of catalyst entry into the lower end of the lift pipe" and equivalent expression, as used herein are intended to broadly include such adjustments. This invention is specifically concerned with this method of operation.

Expressing the desired operation in another way, the rate of linear gas flow in the lift pipe should be controlled so that the pressure drop across the lift is within a low pressure range defined on one side by a minimum gas rate below which the pressure drop increases rapidly due to increase in catalyst stream density and catalyst refluxing or surging in the lift passage and defined on the other side by a maximum above which the pressure drop increases rapidly due to factors other than the contact material flowing in the lift passage, for example power losses in gas expansion, gas friction against the walls, etc.

It has been discovered that the critical catalyst average equilibrium velocity varies depending upon the length of the lift pipe and the ratio of the maximum to mean cross-section of the lift passage. For all operations where the catalyst equilibrium velocity at the upper end of the lift passage is equal to or above zero, i. e. where the lift passage does not flare out very sharply near its upper end, it has been found that in order to prevent excessive and prohibitive catalyst attrition rates the average critical catalyst equilibrium velocity $U_{e(ave.)}$ should be at least equal to:

$$U_{e(ave.)} = 0.5(8.0 + 0.12H_t)\frac{A_{max}}{A_{mean}}$$

and for still better operations at least equal to:

$$U_{e(ave.)} = 0.5(9.0 + 0.12H_t)\frac{A_{max}}{A_{mean}}$$

and preferably at least equal to:

$$U_{e(ave.)} = 0.5(9.6 + 0.132H_t)\frac{A_{max}}{A_{mean}}$$

Hence the average linear velocity of the lift gas through the lift passage must be at least equal to that conforming to the expression, $$U_{g(ave.)} = C_{t(ave.)} + 0.5(8.0 + 0.12H_t)\frac{A_{max}}{A_{mean}}$$

Preferably the average linear gas velocity ($U_{g(ave.)}$) should at least be equal to that conforming to the expression $$U_{g(ave.)} = C_{t(ave.)} + 0.5(9.6 + 0.132H_t)\frac{A_{max}}{A_{mean}}$$

where $H_t$ is the total length of the lift passage in feet, $A_{max}$ and $A_{mean}$ are respectively the maximum and mean horizontal cross-sectional areas in square feet for flow in the lift passage, and $C_{t(ave.)}$ is the average terminal velocity through said lift passage in feet per second of the average sized granules of catalyst. The catalyst terminal velocity is that gas velocity which will just float the catalyst granule in question under the particular operating conditions of temperature pressure and lift gas involved. The catalyst terminal velocity may be readily calculated for any given catalyst and operating conditions by use of equations and published data well known to those skilled in the art. The average catalyst terminal velocity is calculated on the basis of the average temperature and pressure in the lift passage, which in turn are averaged on a volumetric increment basis. The average linear gas velocity is calculated by dividing the average volume of the total air throughput in cubic feet per second under the average temperature and pressure conditions in the lift pipe by the average horizontal cross-sectional area of the lift passage. The average area is the quotient of the total lift passage volume divided by the lift height.

It should be understood that unless otherwise stated the term linear velocity as applied to gas flow in the lift passage is intended to mean actual velocity based on the total free cross section in the pipe less catalyst.

At the lower end of the lift passage the linear gas velocity should be broadly at least equal to that conforming to the equation $$U_{g(bot)} = C_{t(bot)} + (8 + .12H_t)\frac{A_{max}}{A_{mean}}$$

and preferably at least equal to that conforming to the equation:

$$U_{g(bot)} = C_{t(bot)} + (9.6 + 0.132H_t)\frac{A_{max}}{A_{mean}}$$

where $C_{t(bot)}$ is the catalyst terminal velocity at the lower end of the lift pipe.

It has further been found that as the catalyst average actual equilibrium velocity rises above the catalyst average critical equilibrium velocity the rate of catalyst attrition gradually rises as shown in Figure 7 in which the catalyst attrition rate and power efficiency of the pneumatic lift are plotted against the ratio of catalyst average critical equilibrium velocity to catalyst average actual equilibrium velocity.

In connection with the data plotted in Figure 7 it was found that the ratio:

$$\frac{\text{Catalyst ave. equilibrium vel (critical)}}{\text{Catalyst ave. equilibrium vel (actual)}}$$

was equal to the ratio:

$$\left(\frac{\text{Catalyst head \#/in.}^2}{\text{Pressure drop across lift—\#/in.}^2}\right)$$

for all values of the first ratio of 1.0 or less.

In all cases the average linear gas velocity in the lift passage must be maintained broadly below that conforming to the equation, $$U_{g(ave.)} = C_{t(ave.)} + 2.5U_{e(ave.)}$$

more advantageously below $$U_{g(ave.)} = C_{t(ave.)} + 1.8U_{e(ave.)}$$

and preferably below $$U_{g(ave.)} = C_{t(ave.)} + 1.4U_{e(ave.)}$$

where $U_{e(ave.)}$ is the catalyst average equilibrium velocity and $C_{t(ave.)}$ is the catalyst average terminal velocity and where $U_{e(ave.)}$ is broadly at least equal to:

$$U_{e(ave.)} = 0.5(8.0 + .12H_t)\frac{A_{max}}{A_{mean}}$$

more advantageously at least equal to $$U_{e(ave.)} = 0.5(9.0 + .12H_t)\frac{A_{max}}{A_{mean}}$$

and preferably at least equal to $$U_{e(ave.)} = 0.5(9.6 + 0.132H_t)\frac{A_{max}}{A_{mean}}$$

The limits disclosed above for gas velocity within the lift passage are broadly applicable to granular solids within the range about ½ inch to 100 mesh Tyler, (preferably 4–60 mesh), 20–130 pounds per cubic foot (preferably 30–70 #/cu. ft.) density, and 60–100 and preferably 80–100 hardness by the hardness test described hereinbelow. As to the size distribution of the contact material stream to which the above discussed critical velocity limits apply, at least about 98% of the contact material should fall within a range of particle average diameters wherein the ratio of maximum to minimum particle average diameter is below 5 and preferably below 2.5.

The hardness test referred to above is one wherein an 80 cc.±2 cc. sample of the granular material falling within a determined screen analysis range is poured into a 3½ inch diameter, by 3¾" high can with full top opening friction fit lid. Eight smooth surface steel balls of 15⁄16 inch diameter (55±0.5 grams per ball) are added to the can. The can is then closed, positioned on a roller machine with its axis horizontal and rolled about its axis for 1 hour. The sample is then screened over Tyler Standard Screen of next largest number above the number corresponding to the smallest particles in the original sample, for example, if the original sample fell within the range #3–5 Tyler screen size, a #6 Tyler screen would be used. The Hardness Index is the weight material retained on the screen in the final screen analysis (i. e. the #6 screen in the above example) times 100 divided by the weight of the original sample. As an example in the case of spherical gel catalyst granules, the catalyst is tempered at 1050° F. for 3 hours in bone dry atmosphere and screened to provide a sample falling within the range #3–5 Tyler screen size. This sample is then rolled as described and the rolled material is screened over a #6 screen using a standard Ro-Top machine.

The velocity limits discussed hereinabove further apply to operations in which the stream density in the lift passage is within the range about 0.002 to 20 pounds per cubic foot and preferably within the range about 0.5–3.0 pounds per cubic foot. The average pressure drop per foot of lift pipe may range from $1.4 \times 10^{-5}$ to 0.14 pounds per square inch per foot of lift pipe length and preferably from $3.5 \times 10^{-3}$ to $2.1 \times 10^{-2}$ pounds per square inch per foot depending upon the lift height and other operating conditions. The lift passage may range from 5–400 feet and preferably from 40–300 feet high and from one inch to six feet and preferably 3″–48″ diameter or equivalent thereof in cross-sectional area.

While the present invention is not restricted thereto, it has been found preferable to taper the lift pipe so that its diameter gradually increases at successively higher levels. The design and operation of tapered lift pipes of the kind referred to is the subject matter of claims in Serial Number 298,592, filed in the United States Patent Office on July 12, 1952, as a continuation-in-part of this application. One example of such a lift pipe which has been operated also in accordance with the method of the present invention involved a lift pipe having a lower frusto-conical portion extending 65% of the upper length. In this example the diameter of the lift passage was 25.65″, 27″, 29″, 31.7″ and 39.3″ at the lower end, 50 feet up, 100 feet up, 150 feet up and 237 feet up (upper end) respectively. The mean diameter was 30.9″. For this lift pipe the ratio of maximum to mean cross-sectional area was 1.62 and the ratio of minimum to mean cross-sectional area was 0.7. The critical minimum catalyst equilibrium velocity at the lower end of this lift pipe and the average for the lift pipe were about 67.2 feet per second and 33.6 feet per second respectively. In a typical operation transferring a bead form catalyst of 0.142 inch average particle diameter, and 42 pounds per cubic foot settled bed density (i. e. density measured as poured into a receptacle without further packing), 12,120 cubic feet per minute (standard conditions) air were employed to transfer 256 tons of catalyst per hour at a temperature of about 810° F. The total pressure drop across the lift pipe was about 1.14 pounds per square inch. The linear gas velocities at the lower and upper ends of the lift pipe were 141 and 59 feet per second respectively. The catalyst equilibrium velocity at the lower and upper ends of the lift pipe were 90.6 and 8.8 feet per second respectively. The catalyst velocities in the lift pipe were 46.5 feet per second average, 68.0 feet per second maximum and 17.5 feet per second at the upper end of the lift passage. The flowing density of the lift stream was about 0.58 pound per cubic foot. The attrition at the time of an early run on a new catalyst was about 0.75 ton per day for each 100 tons per hour of catalyst passed through the lift pipe and this corresponds to about 0.53 ton per day on the basis of an "equilibrium catalyst," i. e., a catalyst which has been circulated through the unit for a period of time so that it becomes more resistant to attrition. The catalyst involved in this example was a synthetic silica-alumina gel prepared in the manner described in United States Patent No. 2,384,949, issued September 18, 1945.

In another example of a tapered lift pipe which has also been operated in accordance with this invention, the diameter at the bottom, 50 feet up, 100 feet up, 150 feet up and 200 feet up (upper end) were 15⅜″, 16⅛″, 16¾″, 18″ and 20⅛″ respectively. The critical minimum catalyst equilibrium velocity at the bottom of this pipe was 49–50 feet per second (see Figure 5). The critical minimum average catalyst equilibrium velocity for the full length of the lift pipe was about 25 feet per second, as shown in Figure 3.

Typical examples of the operation of this lift pipe are given in Table I below. In Table I, runs A, B and C represent operations on the same synthetic silica-alumina gel bead catalyst mentioned in the example above, while run D involved an operation on a natural montmorillonite clay type pelleted catalyst of about 0.165 inch mean diameter, and about 50 pounds per cubic foot loose density as poured into a measuring container.

*Table I*

| Catalyst Throughput, Tons/Hour | Average Catalyst Velocity At Upper End of Lift pipe, ft./sec. | Lift Stream Density, #/cu. ft. | Steam Lift Gas, #/hr. | Average Lift Gas Linear Velocity, Feet/Sec. | Average Temperature, °F. | Pressure in Lift Pipe, Inches of Hg | | | Catalyst Attrition Rate, Tons/Day per 100 Tons Throughput | Run |
|---|---|---|---|---|---|---|---|---|---|---|
| | | | | | | Top | Bottom | ΔP | | |
| 52 | 8 | 0.61 | 8,515 | 101.4 | 727 | 20.8 | 22.6 | 1.80 | 0.130 | A |
| 100 | 16 | 1.08 | 8,529 | 103.1 | 728 | 19.1 | 22.72 | 3.62 | 0.199 | B |
| 154 | 25 | 1.41 | 8,498 | 112.3 | 705 | 16.5 | 22.42 | 5.92 | 0.375 | C |
| 114 | | | 8,680 | 109 | 708 | 17.34 | 20.88 | 3.54 | 0.40 | D |

The catalyst transfer may be effected by applying suction to the separator surrounding the upper end of this lift pipe so that the pressure at the upper end of the lift pipe is about 14.2#/in.² absolute and that at the lower ends is about 14.7#/in.² absolute. If desired, gas may be withdrawn at intermediate points along the lift to control the velocity of the contact material discharging from the upper end of the lift passage.

The specific method of controlling the velocity of the contact material at the upper end of the lift passage and at points along the lift passage by withdrawal of gas at one or more intermediate points along the lift pipe is disclosed and claimed in copending United States patent application Serial Number 211,344, filed February 16, 1951, now abandoned.

Typical examples of the operation of a straight 3″ diameter, 40 feet high lift pipe having intermediate gas outlet ports are set forth in Table II. This lift pipe utilized air supplied under the required pressure as the transfer gas and employs the type of lift feed tank shown in Figure 1.

*Table II*

| Catalyst Throughput, Tons/Hour | Average Catalyst Velocity At Upper End of Lift Pipe Feet/Sec. | Air Lift Gas Change Std., cu.¹/min. | Average Lift Gas Linear Velocity Feet/Sec. | Average Temperature °F. | Pressure in Lift Pipe, Inches of Hg | | ΔP | Catalyst Attrition Rate, Tons/Day per 100 Tons Throughput | Lift Stream Density, #/cu.¹ |
|---|---|---|---|---|---|---|---|---|---|
| | | | | | Top | Bottom | | | |
| 7.85 | 8.6 | 122 | 40.9 | 69 | 30 | 38 | 8 | 0.028 | 9.8 |
| 8.0 | 10.8 | 137.5 | 42.9 | 72 | 30 | 38.2 | 8.2 | 0.111 | 8.0 |
| 12.7 | 11.0 | 134 | 43.0 | 70 | 30 | 41 | 11 | 0.104 | 12.4 |

It is to be understood that the specific examples of apparatus design and arrangement and of operation and application of this invention are intended only as illustrative and it is intended to cover all changes and modifications of the examples of the invention herein chosen for purposes of the disclosure, which do not constitute departures from the spirit and scope of the invention.

I claim:

1. A method for pneumatically transferring granular solid material from a zone at one elevation to a second zone at a higher elevation without excessive attrition and breakage of the solid granules which comprises, forcing the solid material from said first zone into the lower end of a confined lift passage extending upwardly from the zone at the lower elevation to a separation zone at the higher elevation, said separation zone being of substantially greater horizontal cross-section than said lift passage, carrying the granular material upwardly, suspended in a suitable lift gas through said lift passage and discharging it from the upper end of said passage upwardly into said separation zone where the granular material rapidly decelerates and then drops down onto a retaining surface shortly below the upper end of said lift passage in said separation zone, observing the pressure drop due to the flow across the total length of said lift passage regulating the rate of granular material entry to said lift passage to a fixed value and adjusting the total rate of gas supplied to the lower end of said lift passage to maintain the total pressure drop at a minimum value for the fixed rate of granular material supply.

2. A method for pneumatically transferring granular solid material from a zone at one elevation to a second zone at a higher elevation without excessive attrition and breakage of the solid granules which comprises, forcing the solid material from said first zone into the lower end of a confined lift passage extending upwardly from the zone at the lower elevation to a separation zone at the higher elevation, said separation zone being of substantially greater horizontal cross-section than said lift passage, carrying the granular material upwardly, suspended in a suitable lift gas through said lift passage and discharging it from the upper end of said passage upwardly into said separation zone, regulating the rate of granular material entry into said lift passage at a fixed value and adjusting the rate of gas supply to the lower end of said lift while observing the pressure at the lower end of the lift passage so that the total rate of gas supply is at least equal to and not more than 20 percent in excess of that minimum rate at which the total pressure at the lower end of the lift passage reaches a minimum value.

3. In a process for pneumatically transferring granular solids suspended in a lift gas from one location upwardly as a confined stream to a second location at a higher level, the improvement which comprises, supplying the solids to be transferred into the lower end of said stream at the desired rate and controlling the rate of gas supply to said confined stream within a narrow range at which the pressure drop across said lift is substantially at a minimum for the rate of solids transfer involved, whereby the rate of attrition of said solids is maintained substantially at a minimum.

4. In a process for pneumatically transferring granular solids suspended in a lift gas from one location upwardly as a confined stream to a second location at a higher level, the improvement which comprises, regulating the volumetric rate of solids transfer at the desired value by regulating the rate of solids entry into said lift stream and controlling the linear velocity of gas flow in said confined stream within the range about 2–20 percent above the minimum gas rate at which the total pressure drop across said stream is substantially at a minimum.

5. A method for pneumatically transferring granular solid material from a zone at one elevation to a second zone at a higher elevation without excessive attrition and breakage of the solid granules which comprises, forcing the solid material from said first zone into the lower end of a confined lift passage extending upwardly from the zone at the lower elevation to a separation zone at the higher elevation, said separation zone being of substantially greater horizontal cross-section than said lift passage, carrying the granular material upwardly, suspended in a suitable lift gas through said lift passage and discharging it from the upper end of said passage upwardly into said separation zone, regulating the volumetric rate of granular material entry into said lift passage at the desired level, ascertaining the minimum rate of gas flow through said lift substantially required to maintain a minimum total pressure at the lower end of said lift passage without refluxing of the granular material and controlling the gas flow rate above but not more than about 4 to 6 percent above said minimum rate, whereby the pressure at the lower end of said passage is maintained substantially at a minimum and excessive attrition of the granular material is avoided.

References Cited in the file of this patent

UNITED STATES PATENTS

| | | |
|---|---|---|
| 1,339,977 | Pruden | May 11, 1920 |
| 1,619,577 | Jensen | Mar. 1, 1927 |
| 2,398,759 | Angell | Apr. 23, 1946 |
| 2,509,983 | Morrow | May 30, 1950 |
| 2,541,077 | Leffer | Feb. 13, 1951 |
| 2,542,887 | Watson | Feb. 20, 1951 |
| 2,546,625 | Bergstrom | Mar. 27, 1951 |
| 2,548,286 | Bergstrom | Apr. 10, 1951 |
| 2,561,771 | Ardern | July 24, 1951 |
| 2,587,670 | Weinrich | Mar. 4, 1952 |
| 2,625,442 | Kollgaard | Jan. 13, 1953 |
| 2,666,731 | Bergstrom | Jan. 19, 1954 |
| 2,676,142 | Crowley | Apr. 20, 1954 |

FOREIGN PATENTS

| | | |
|---|---|---|
| 180,397 | Great Britain | May 11, 1922 |